May 7, 1929.  J. A. GRANSTEDT  1,711,887
WHEEL FOR MOTOR VEHICLES
Filed May 9, 1928
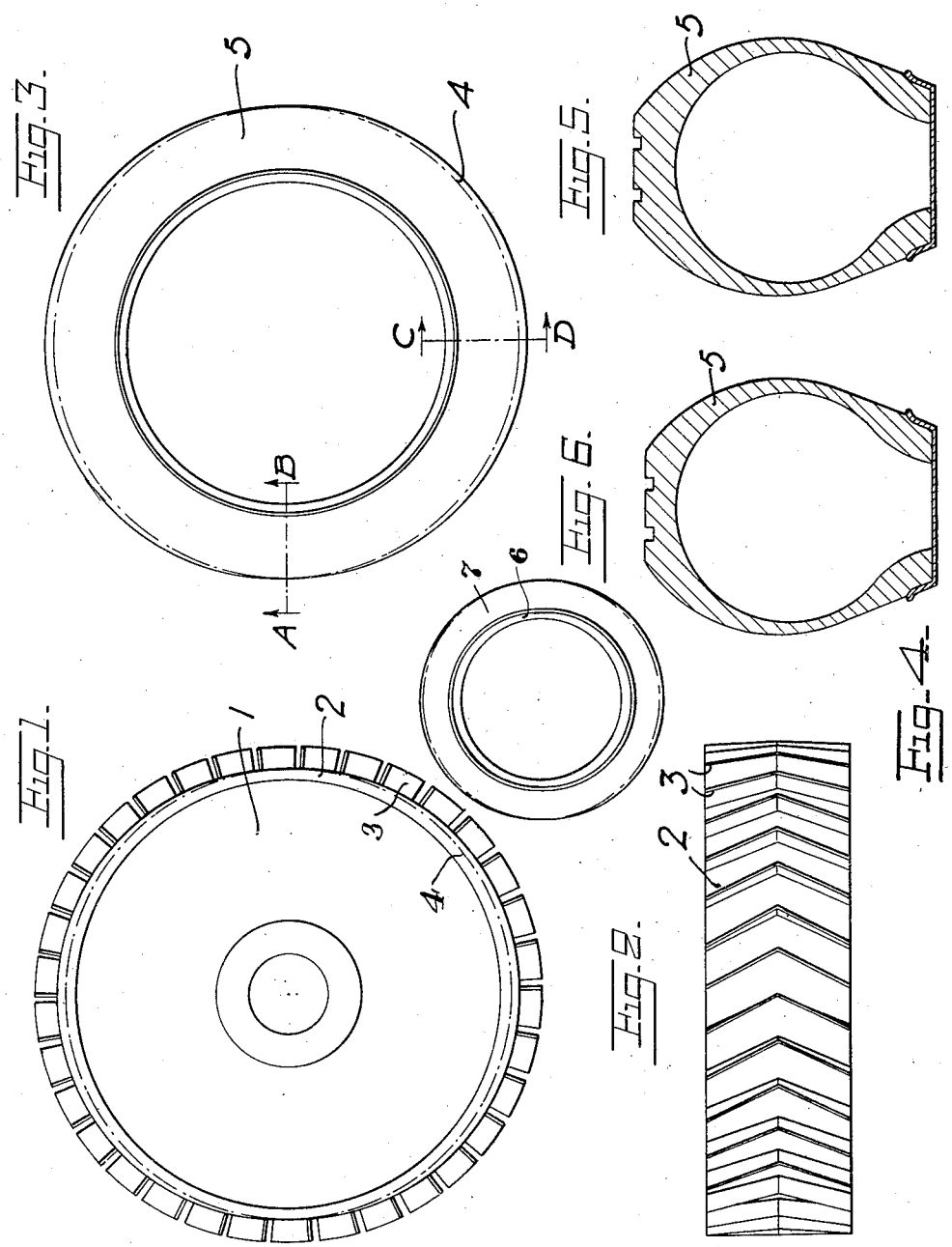
Inventor
Johan A. Granstedt
By Henry Orth Jr
Att.

Patented May 7, 1929.

1,711,887

UNITED STATES PATENT OFFICE.

JOHAN ANSHELM GRANSTEDT, OF SJALEVAD, SWEDEN, ASSIGNOR TO GUNNAR PER OLOF FOGELQVIST, OF SUNDSVALL, SWEDEN.

WHEEL FOR MOTOR VEHICLES.

Application filed May 9, 1928, Serial No. 276,406, and in Sweden March 12, 1925.

This invention relates to an improved wheel for motor vehicles.

The object of the invention is to provide a wheel which has a better power of gripping the roadway than ordinary wheels and therefore is less subjected to skidding or slipping when driving in snow, on loose roads and drenched ground etc.

The invention consists, chiefly, in giving the wheel, when unloaded, an oblong or elliptic contour in planes at right angles to the axle of the wheel.

Three embodiments of the invention are shown in the accompanying drawings. Fig. 1 shows an elevation of a tractor wheel according to the invention and Fig. 2 is a view at right angles to the view in Fig. 1. Fig. 3 shows an elevation of a pneumatic auto-car tire according to the invention, Figs. 4 and 5 are sections on the lines A—B and C—D respectively in Fig. 3. Fig. 6 is an elevation of another auto-car tire and felly according to the invention.

Referring now to Figs. 1–2, the tractor wheel 1 is provided with an oblong or elliptical rim or tread 2 of rigid material which supports angular flanges 3 in the usual manner. Said flanges 3 are made of a rigid material and all equally high and thus their outer edges also form an elliptic contour Fig. 1 concentric with the elliptic rim. The deviation of the rim from the usual circular form is seen from a comparison between the dotted circle 4 and the outer contour line of the rim.

In Figs. 3–5 a pneumatic tire 5 for autocars is shown, which has been given an oblong or elliptic contour by increasing the thickness of the outer rubber layer successively from two diametrically opposite points of the wheel periphery to two points at right angles thereto, as is more clearly seen from Figs. 4 and 5, showing two sections on the lines A—B and C—D respectively at right angles to each other through the lowest and the highest portions of the tire tread. The dotted line 4 indicates the usual circular contour of autocar tires.

In Fig. 6 a detachable rim 6 is shown, whose outer contour is elliptical and inner contour is circular to fit on a wheel felly of the usual circular type. On said rim a pneumatic tire 7 of the usual design is mounted which consequently assumes a corresponding elliptical shape.

Experiments have proved that this oblong or elliptic form of the tread or rim contour of the wheel is much superior to the usual wheel shape and involves complete elimination of slipping and prevents the wheel from rotating in its own groove without pushing the vehicle forward. A vehicle having wheels according to this invention can therefore be driven also on loose roads, drenched ground, in snow etc., where a vehicle fitted with usual wheels would stop because of the wheels cutting themselves down and remaining rotating in one and the same place.

What I claim is:—

1. A wheel for motor vehicles having when unloaded an oblong or elliptic contour in planes at right angles to the axle of the wheel.

2. In a wheel for motor vehicles, a rim of rigid material having elliptic shape in planes at right angles to the axle of the wheel, when the wheel is unloaded.

3. In a wheel for motor vehicles, a rim of rigid material having elliptic shape in planes at right angles to the axle of the wheel, when the wheel is unloaded, and flanges of rigid material mounted thereon all of said flanges having the same height.

In testimony whereof I have signed my name.

JOHAN ANSHELM GRANSTEDT.